United States Patent
Naegeli et al.

(10) Patent No.: US 6,895,043 B1
(45) Date of Patent: May 17, 2005

(54) METHOD AND APPARATUS FOR MEASURING QUALITY OF UPSTREAM SIGNAL TRANSMISSION OF A CABLE MODEM

(75) Inventors: Charles J. Naegeli, Montara, CA (US); Mark E. Millet, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 27 days.

(21) Appl. No.: 09/325,534

(22) Filed: Jun. 3, 1999

(51) Int. Cl.[7] .............................................. H04L 12/43
(52) U.S. Cl. ...................... 375/224; 375/257; 370/459; 725/111
(58) Field of Search ................................. 375/242, 224, 375/254, 257, 258, 295, 296, 297, 298, 287, 288, 308, 312, 316, 317, 346, 350, 286, 222; 370/229, 241, 431, 458, 459; 455/5, 5.1; 348/177, 180; 725/111, 107; 379/1.01, 1.04, 2, 93.01

(56) References Cited

U.S. PATENT DOCUMENTS

| | | | |
|---|---|---|---|
| 5,832,032 A | * | 11/1998 | Overbury ..................... 370/201 |
| 5,862,451 A | | 1/1999 | Grau et al. |
| 5,926,479 A | * | 7/1999 | Baran .......................... 370/252 |
| 5,943,604 A | | 8/1999 | Chen et al. |
| 6,141,317 A | * | 10/2000 | Marchok et al. ............ 370/207 |
| 6,574,797 B1 | * | 6/2003 | Naegeli et al. ............. 725/120 |

* cited by examiner

Primary Examiner—Tesfaldet Bocure
Assistant Examiner—Pankaj Kumar
(74) Attorney, Agent, or Firm—Beyer Weaver & Thomas LLP

(57) ABSTRACT

A media access control (MAC) unit in a CMTS assigns a normal time slot to a cable modem being tested for its upstream transmission quality. An FFT generator or engine operating in conjunction with the CMTS is informed of this normal time slot. A dummy time slot, not assigned to any cable modem, is created and the FFT generator is informed of the dummy time slot. A number of FFT measurements of the upstream channel are generated during the normal time slot and during the dummy time slot. FFT measurements of the upstream spectrum taken during the normal time slot are compared to FFT measurements taken during the dummy time slot. Through this comparison, undesirable noise spurs, if any, can be detected in the upstream spectrum caused by the cable modem being tested.

41 Claims, 6 Drawing Sheets

METHOD AND APPARATUS FOR MEASURING QUALITY OF UPSTREAM SIGNAL TRANSMISSION OF A CABLE MODEM

BACKGROUND OF THE INVENTION

1. Field of the Invention

The present invention relates to transmitting data over existing cable television plants using cable modems. More specifically, it relates to reducing noise outside a particular channel created by cable modems while transmitting data on the upstream path in the cable television plant.

2. Discussion of Related Art

The cable TV industry has been upgrading its signal distribution and transmission infrastructure since the late 1980s. In many cable television markets, the infrastructure and topology of cable systems now include fiber optics as part of their signal transmission components. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these truck lines were distribution or feeder cables (40% of the system's cable footage) to specific neighborhoods, and drop cables (45% of the system's cable footage) to homes receiving cable television. Amplifiers were provided to maintain signal strength at various locations along the line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have installed the equipment necessary for sending signals from subscribers to the head end, known as return or upstream signal transmission. Not surprisingly, nor were there provisions for digital signal transmission either downstream or upstream.

In the 1980s, cable companies began installing optical fibers between the head end of the cable system and distribution nodes (discussed in greater detail with respect to FIG. 1 below). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep to the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 that is needed when transmitting and receiving data using cable modems. CMTS 104 is discussed in greater detail with respect to FIG. 2. Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction (frequency ranges for upstream and downstream paths are discussed below). Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscribers tap 118 is connected to a cable modem 120. Cable modem 120 is, in turn, connected to a subscriber computer 122.

Recently, it has been contemplated that HFC cable systems could be used for two-way transmission of digital data.

The data may be Internet data, digital audio, or digital video data, in MPEG format, for example, from one or more external sources 100. Using two-way HFC cable systems for transmitting digital data is attractive for a number of reasons. More notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

Time to Transmit a Single 500 Kbytes Image

| | |
|---|---|
| Telephone Modem (28.8 KBPS) | 6–8 minutes |
| ISDN Line (64 KBPS) | 1–1.5 minutes |
| Cable Modem (30 Mbps) | 1 second |

Furthermore, subscribers can be fully connected twenty-four hours a day to service without interfering with cable television service to phone service. The cable modem, an improvement of a conventional PC data modem, provides this high speed connectivity and is, therefore, instrumental in transforming the cable system into a full service provider of video, voice and data telecommunication services.

As mentioned above, the cable industry has been upgrading its coaxial cable systems to HFC systems that utilize fiber optics to connect head ends to fiber notes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution system that use fiber optics need fewer amplifiers to maintain better signal quality.

In cable systems, digital data is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as full service provider of video, voice and data telecommunication services. Among the elements that have made this transition possible are technologies such as the cable modem.

A problem common to all upstream data transmission on cable systems, i.e. transmission from the cable modem in the home back to the head end, is ingress noise at the head end which lowers the signal-to-noise ratio, also referred to as carrier-to-noise ratio. Ingress noise can result from numerous internal and external sources. Sources of noise internal to the cable system may include cable television network equipment, subscriber terminals (television, VCRs, cable modems, etc.), intermodular signals resulting from corroded cable termini, and core connections. One source of ingress noise is cable modems. In particular, transient noise coming from the upstream transmitter can create noise on the upstream channel. This is described in greater detail below.

The portion of bandwidth reserved for upstream signals is normally in the 5 to 42 MHz range. Some of this frequency band may be allocated for set-top boxes, pay-per-view, and other services provided over the cable system. Thus, a cable modem may only be entitled to some fraction (i.e., a "sub-band") such as 1.6 MHz, within a frequency range of frequencies referred to as its "allotted hand slice" of the entire upstream frequency band (5 to 42 MHz). This portion of the spectrum—from 5 to 42 MHz—is particularly subject to ingress and transient noise, and other types of interference. Thus, cable systems offering two-way data services must be designed to operate given these conditions.

Although not fully agreed to by all parties in the cable TV and cable modem industry, an emerging standard establishing the protocol for two-way communication of digital data on cable systems has been defined by a consortium of industry groups. The protocol, known as the Multimedia Cable Network System (MCNS), specifies particular standards regarding the transmission of data over cable systems. With regard to the sub-band mentioned above, MCNS specifies that the bandwidth of a data carrier should generally be 200 KHz to 3.2 MHz. Further references to MCNS standards will be made in the specification.

Block 104 of FIG. 1 represents cable modem termination system connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate MAC level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

FIG. 2 is a block diagram showing the basic components of a cable modem termination system (item 104 of FIG. 1). Data Network Interface 202 is an interface component between an external data source and the cable system. External data sources (item 100 of FIG. 1) transmit data to data network interface 202 via optical fiber, microwave link, satellite link, or through various other media. A Media Access Control block (MAC) 204 receives data packets from a Data Network Interface 202. Its primary purpose is to encapsulate a MAC header according to the MCNS standard containing an address of a cable modem to the data packets. MAC Block 204 contains the necessary logic to encapsulate data with the appropriate MAC addresses of the cable modems on the system. Each cable modem on the system has its own MAC address. Whenever a new cable modem is installed, its address must be registered with MAC Block 204. The MAC address is necessary to distinguish data from the cable modems since all the modems share a common upstream path, and so that the system knows where to send data. Thus, data packets, regardless of format, must be mapped to a particular MAC address.

MAC Block 204 also provides ranging information addressed to each cable modem on its system. The ranging information can be either timing information or power information. MAC Block 204 transmits data via a one-way communication medium to a Downstream Modulator and Transmitter 206. Downstream modulator and transmitter 206 takes the packet structure and puts it on the downstream carrier. It translates the bits in the packet structure to 64 QAM in the downstream (and 16 QAM or quadrature phase shift keying (QPSK) is used on the upstream path). These modulation methods are known in the art and are also specified in the MCNS protocol. It should be noted that optical fibers used in most cable systems today transmit data in one direction (some fiber optic systems can transmit bi-directional optical signals over a single fiber) and coaxial cables can transmit data in two directions. Thus, there is only one coaxial cable leaving the fiber node which is used to send and receive data, whereas there are two optical fiber lines from the fiber node to the downstream and upstream modulators.

Downstream Modulator and Transmitter 206 converts the digital data packets to modulated downstream RF frames, such as MPEG or ATM frames, using quadrature amplitude modulation, e.g. 64 QAM, forward error correcting (FEC) code, and packet interleaving. Converter 208 converts the modulated RF electrical signals to optical signals that can be received and transmitted by a Fiber Node 210. Each Fiber Node 210 can generally service about 500 subscribers. Converter 212 converts optical signals transmitted by Fiber Node 210 to electrical signals that can be processed by an Upstream Demodulator and Receiver 214. This component demodulates the upstream RF signal (in the 5–42 MHz range in the United States) using, for example, 16 QAM or QPSK. It then sends the digital data to MAC 204.

In accordance with the DOCSIS standard, a cable modem must transmit signals within its designated or allocated upstream channel without creating noise spikes, referred to as spurs, anywhere in the rest of the upstream spectrum. That is, a cable modem must be "quiet" outside the channel it has been designated to transmit data. A problem occurs when either the RF amplifiers in a cable modem's upstream transmitter begin to degrade, the modem's processor degrades over time, or the modem is damaged for any other reason. When the upstream transmitter is faulty, noise signals emitted by a cable modem will look splattered, often with one noticeable spur, throughout the upstream channel. This is often referred to as a transmitter being non-linear in that it creates intermodulation. This is in contrast to being linear where the transmitter simply amplifies its input. The noise created by a faulty cable modem can interfere with the upstream transmission of data on other cable modems.

In addition to being noncompliant with DOCSIS, such degradation effectively reduces the frequency available for other cable modems to transmit data on the upstream data path. A group or system of cable modems typically uses time-division multiplexing and frequency-division multiplexing (the width of frequencies can range from 160 kHz to 2.56 MHz). Thus, noise interference occurring in portions of the frequency spectrum not allocated to a system of cable modems in which a faulty cable modem belongs can cause poor transmission for other systems of cable modems.

Therefore, it would be desirable to be able to detect and identify a cable modem creating unintentional noise in the upstream frequency spectrum. It would be desirable to detect faulty or degrading cable modems during normal operation and in close to real time by measuring noise outside an allocated channel to determine whether a particular cable modem is creating noise spurs. Furthermore, it would be desirable to measure unintentional noise created by a cable modem with reduced manual or human intervention, and have the option of conducting noise checks in different modes of operation, such as continuous or on demand.

SUMMARY OF THE INVENTION

According to the present invention, methods, apparatus, and computer program products for determining the upstream signal transmission quality of a cable modem are disclosed. A normal time slot is assigned to a cable modem being tested for its upstream transmission quality, in which the cable modem can transmit data upstream. The time slot is typically assigned by a media access control (MAC) unit. An FFT generator or engine is informed of this time slot. A dummy time slot, not assigned to any cable modem, is created and the FFT generator is informed of this dummy time slot. A number of FFT measurements of the upstream channel are generated during the normal time slot and during the dummy time slot. FFT measurements of the upstream spectrum taken during the normal time slot are compared to FFT measurements taken during the dummy time slot. Through this comparison, undesirable noise spurs, if any, can be detected in the upstream spectrum caused by the cable modem being tested.

In another embodiment, an upstream receiver in the CMTS is informed of the normal time slot and the dummy time slot. In yet another embodiment, only the FFT generator is informed of the dummy time slot.

In another aspect of the present invention, a cable modem termination system (CMTS), having a media access control (MAC) unit, is capable of identifying a faulty cable modem is described. The CMTS includes an upstream receiver and demodulator that receives an upstream signal from a cable modem. Associated with the CMTS is a Fast Fourier Transform (FFT) engine for performing FFT measurements on the upstream signal and storing the measurements. Also associated with the CMTS is a processor that performs computations on the FFT measurements and communicates the computational data to a MAC unit in the CMTS.

In one embodiment, associated with the CMTS are an anti-alias filter utilizing a low-pass filter and an analog/digital converter for converting an analog signal to a digital signal. In another embodiment, the FFT engine is implemented using a field programmable gate array (FPGA) configured to perform an FFT.

BRIEF DESCRIPTION OF THE DRAWINGS

This invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In accordance with one embodiment of the present invention, there is provided methods and apparatus for detecting faulty or degrading cable modems in a cable television plant as described in the various figures. A faulty cable modem, typically containing an upstream transmitter with a degrading RF amplifier, can transmit unwanted noise in channels other than the one allotted to it. This can interfere with the transmission quality of other cable modems using those channels to transmit data upstream to a CMTS. Unwanted noise outside an allotted frequency channel for a particular system or group of cable modems created by a particular modem in the cable modem system is typically referred to as a noise spur. These unwanted spurs should be detected as early as possible during normal operation of the cable modem so that the carrier-to-noise ratio of other cable modems are not adversely effected for prolonged periods. This can be done by comparing two frequency-power spectrums, each created by performing a Fast Fourier Transform (FFT) at two different and predetermined times. In the described embodiment, one of the time slots is a normal time slot allocated to a cable modem or system of cable modems. The other time slot is not allocated to any system of cable modems and thus does not carry a signal. An FFT measurement during this "dummy" time slot measures a noise floor. This measurement is compared to an FFT of a signal transmitted during a time slot used in normal operation by a system of cable modems.

Before describing a process of obtaining and comparing the frequency-power spectrums described briefly above, components used in the cable plant to measure and store the necessary data are discussed. In particular, FFT measurements used to create the frequency-power spectrums are performed by an FFT generator contained in a component referred to as a spectrum analyzer in the present invention. In the described embodiment, the FFT generator is implemented on an appropriately configured field programmable gate array (FPGA) described in greater detail in FIG. 5.

Figure 1:
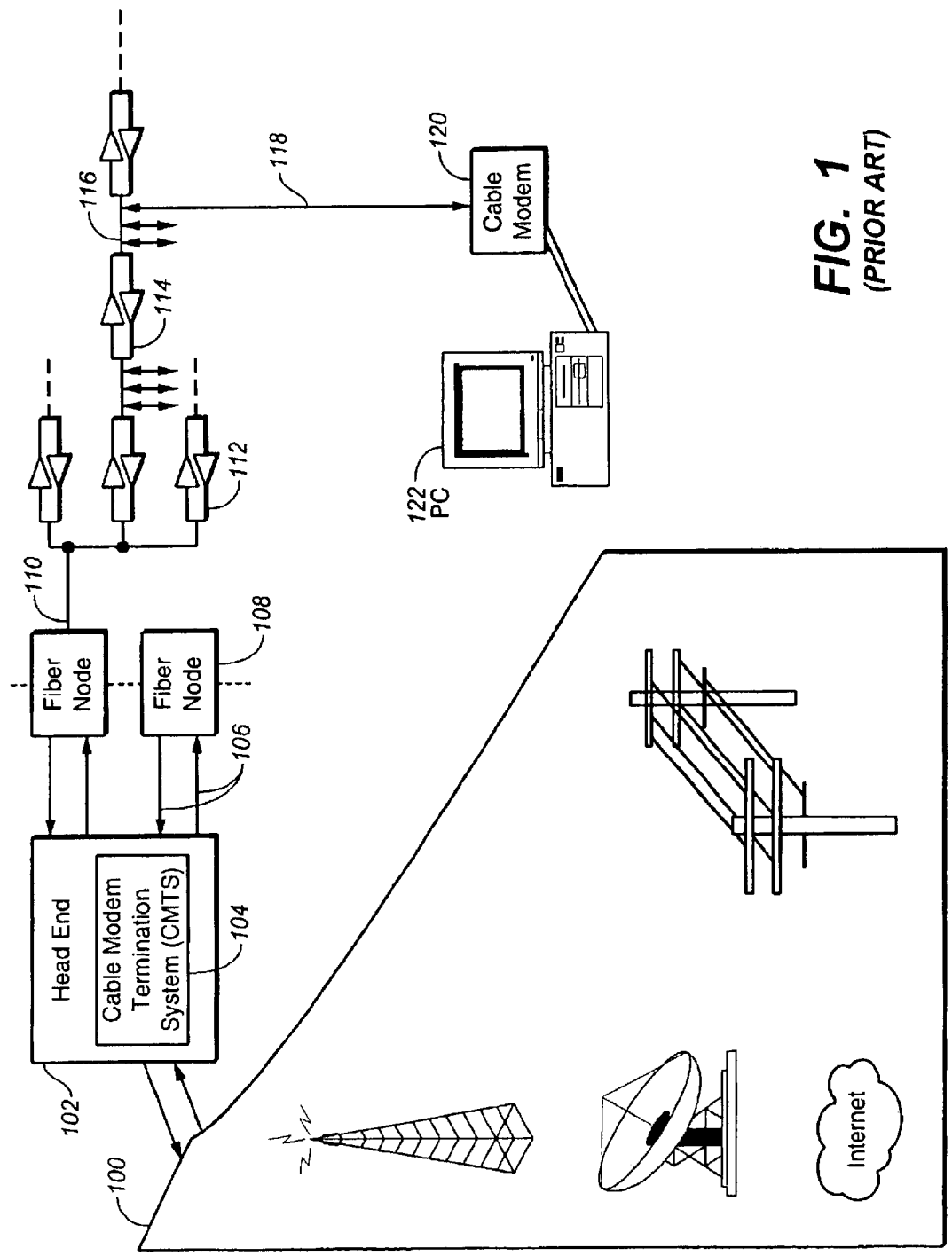
FIG. 1 is a block diagram of a two-way hybrid fiber-coaxial (HFC) cable system utilizing a cable modem for data transmission.
Figure 2:
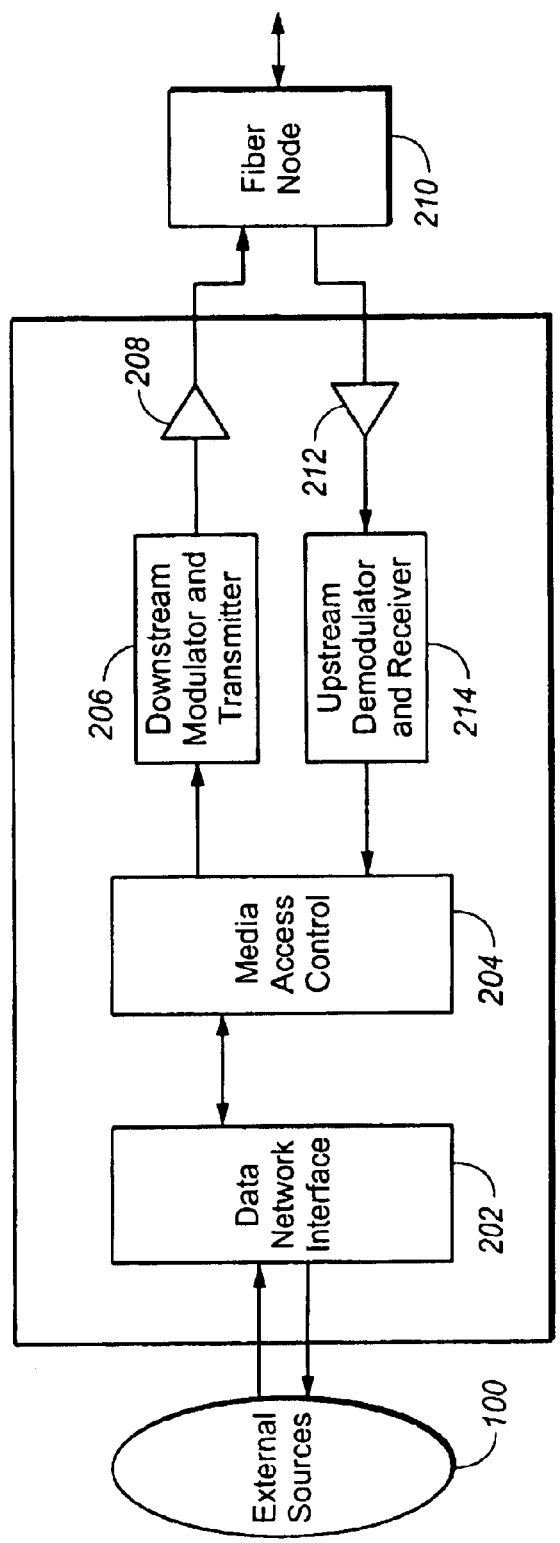
FIG. 2 is a block diagram showing the basic component of a cable modem termination system.
Figure 3:
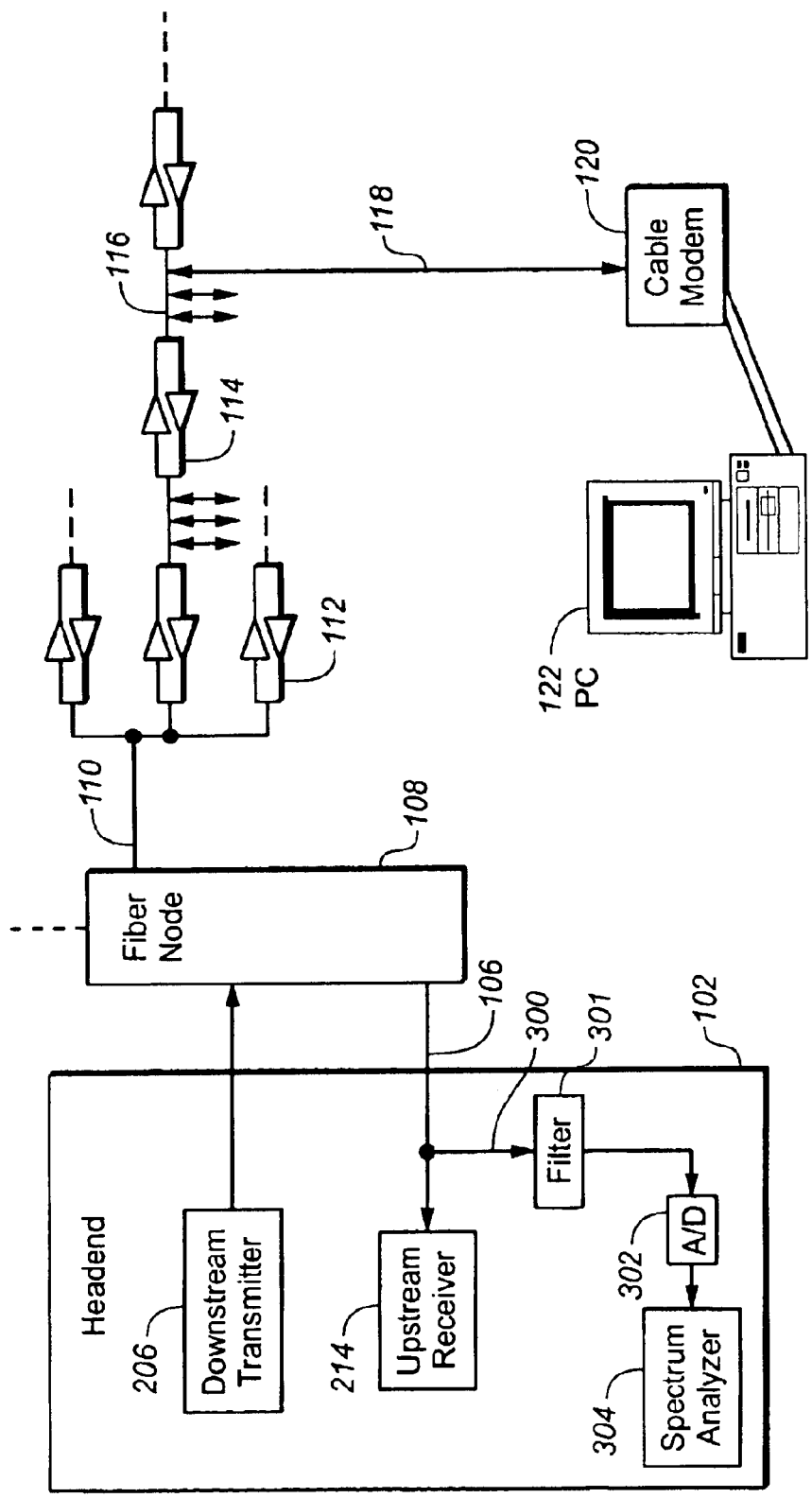
FIG. 3 is a block diagram of a cable plant showing a placement of a spectrum analyzer and related components in accordance with one embodiment of the present invention.

FIG. 3 is a block diagram of a cable plant showing a placement of a spectrum analyzer and related components in accordance with one embodiment of the present invention. A data carrier 300 is shown tapping enable line 106 carrying upstream data from fiber node 108 (described in FIG. 1) and which leads directly to the upstream receiver 214. The upstream analog data is passed through an anti-alias filter 301, generally performing as a low-pass filter and commonly used in the field of data communication systems. In the described embodiment, filter 301 cuts off or filters frequencies higher than 42 MHz, or some other predetermined upper frequency limit. An analog/digital converter 302 digitizes the upstream RF signals and feeds the digitized upstream data to a spectrum analyzer 304. In the described embodiment, spectrum analyzer 304 is located in the CMTS (coupled to a processor on a daughter card). FIG. 3 shows a partial CMTS (downstream transmitter 206, upstream receiver 304, and spectrum analyzer 304). The digital upstream data is not diverted from reaching upstream receiver 214 (it is essential that receiver 214 always be fed the upstream data for two-way data transmission to function); rather, the data is received by both units. The energy of each data stream (one to the upstream receiver and one to the spectrum analyzer) is half of the total energy of the incoming upstream data. In another embodiment, spectrum analyzer 304 can be located on the upstream data path outside the CMTS or external to the headend. Regardless of where spectrum analyzer 304 is located, it accumulates data for further analysis performed by a general-purpose processor.

Figure 4:
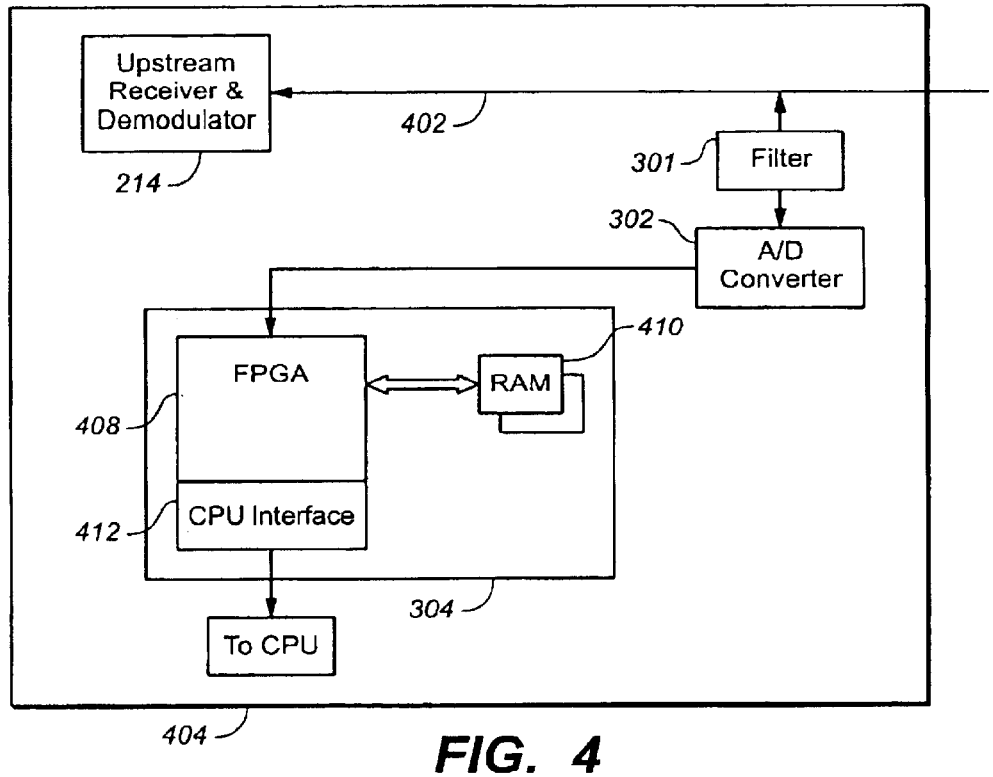
FIG. 4 is a block diagram showing a location of spectrum analyzer 304 and its internal components in accordance with one embodiment of the present invention.

FIG. 4 is a block diagram showing a location of spectrum analyzer 304 and its internal components in accordance with one embodiment of the present invention. An upstream RF signal 402 (signal 106 of FIG. 1) is input to a modified CMTS 404 of the present invention; more specifically to spectrum analyzer 304 and to upstream receiver 214. After passing through anti-alias filter 301 and analog/digital converter 302, signal 402, now digitized, is input to spectrum analyzer 304. The first component in spectrum analyzer 304 to receive the data is a field programming gate array (FFGA) 408 where the data is processed and all mechanical functions are calculated. FFGA 408 is described in greater detail with reference to FIG. 5. Coupled to FPGA 408 are random access memory (RAM) units 410 used to store data necessary for performing the mathematical functions performed by FPGA 408. Once the data is processed by FPGA 408, it can be accessed by a CPU (not shown) through a CPU interface 412, part of FPGA 408. CPU interface 412 is a hardware component that enables a processor to read data from the FPGA. As described in greater detail below, the processor determines whether the cable modem is creating spurs or other undesirable noise outside its allocated channel and should, therefore, be disabled.

Figure 5:
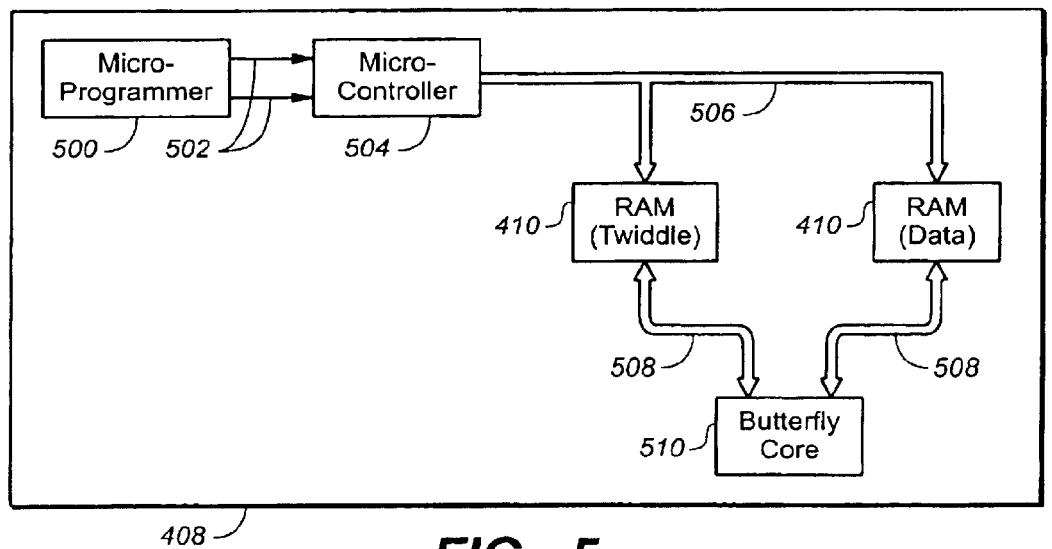
FIG. 5 is a block diagram showing components of an FPGA configured to operate as an FFT generator in accordance with one embodiment of present invention.

FIG. 5 is a block diagram showing components of an FPGA (see item 408 of FIG. 4) configured to operate as an FFT generator in accordance with one embodiment of present invention. Among other functions, an FFT generator is able to receive energy over a programmed period of time for all frequencies in a frequency spectrum, such as for all channels between 5 and 42 MHz. As is well known in the art signal processing, an FPGA can be configured or programmed to perform various mathematical functions. A Fast Fourier Transform is one such function. An FFT is essentially a series of additions and multiplications. It is well known as a method of reducing the total number of computations required in a discrete Fourier transform. An FFT of a frequency spectrum can provide the power levels of discrete points, referred to as FFT points or bins, in the frequency spectrum. These power levels can be interpreted to determine signals and noise in the frequency spectrum.

A microprogrammer component 500 has control over a sequence of mathematical operations. It is responsible for ensuring that the FFT instructions occur in the correct order. It is programmed or configured to perform in FFT mode by a processor. Control lines 502 carry instructions from microprogrammer 500 to a microcontroller component 504. Microcontroller 504 accepts commands and other instructions from microprogrammer 500. It then determines addresses of where to read and write data in RAM banks 410. For example, with an FFT calculation, intermediate data representing the required multiplications and additions can be stored in RAM banks 410.

The addresses are transmitted over an address bus 506 to RAM banks 410. One of the memory banks holds twiddle factors used in the FFT calculations. Buses 508 move data between RAM banks 410 and what is referred to as a "butterfly" core 510 (a necessary component in performing an FFT) which performs all the necessary calculations. In the described embodiment, results of an FFT represent a series of energy levels characterized by amplitudes corresponding to particular channels. These energy levels correspond to channels in the frequency spectrum, in this case, the upstream frequency spectrum. A processor processes the stored data by first accessing the data through an FPGA data port. In the described embodiment, ten-bit data is received by the FPGA at 100 million samples per second. The data is latched and loaded into memory two samples at a time, thereby allowing for low-cost memory. The stored data is then processed by the CPU. While the next data sample is processed, the magnitude and limited average of the preceding values are calculated. The data is then available to a media access control (MAC) unit in the CMTS through an FPGA data port. In other embodiments, once the data is captured, the FFT can be performed by a processor off line. However, this embodiment is significantly slower than using an FFT generator as in the described embodiment.

Figure 6:
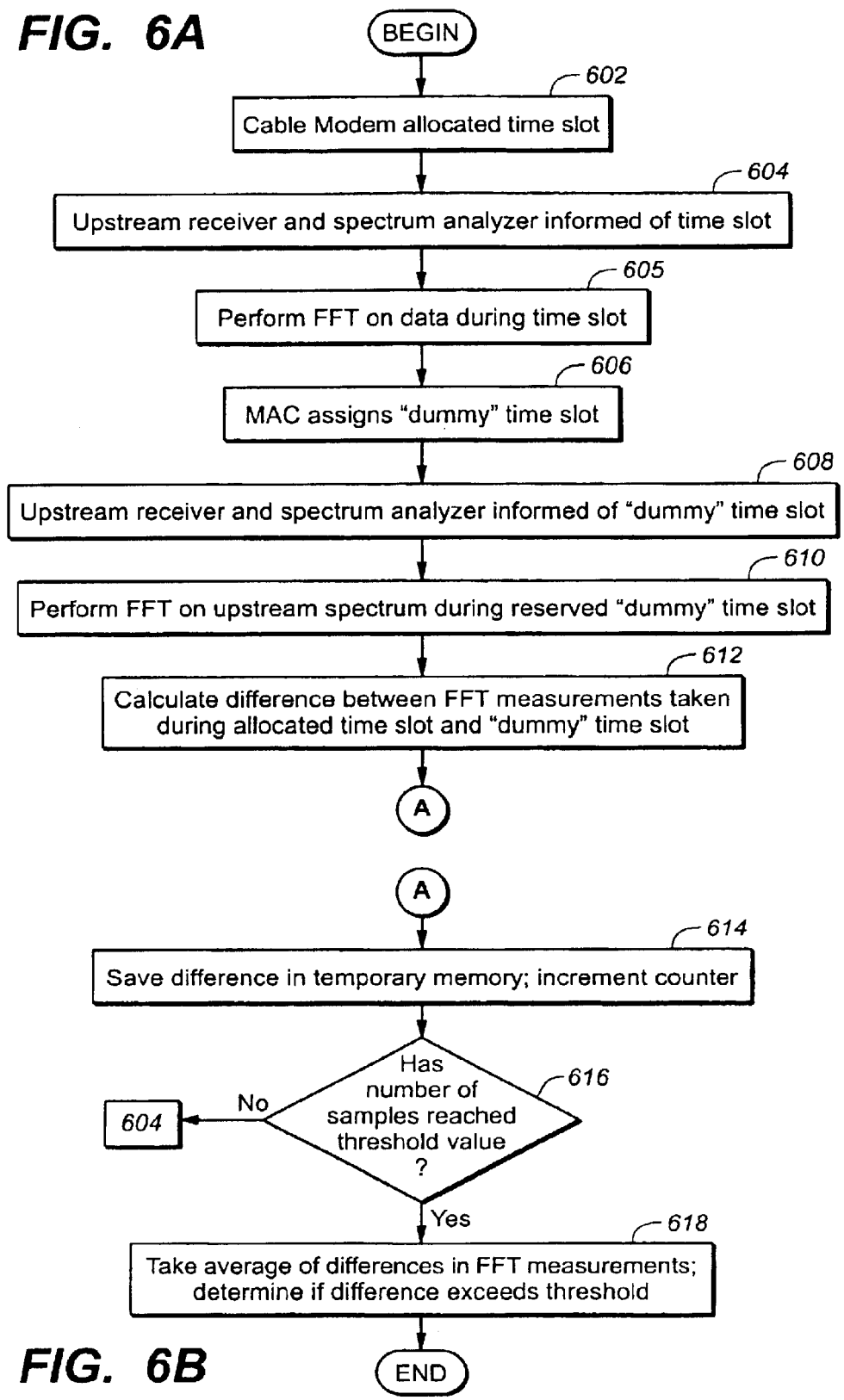
FIGS. 6A and 6B are flow diagrams showing a process for determining the condition of a cable modem by examining transmitted noise on an upstream channel in a cable television plant in accordance with one embodiment of the present invention.

FIG. 6 is a flow diagram showing a process of determining the transmission quality of a cable modem by examining transmitted noise on an upstream channel in a cable television plant in accordance with one embodiment of the present invention. At a step 602 a cable modem is turned on and allocated a time slot, typically in the range of 1 to 10 milliseconds, in which the modem can transmit data upstream to a CMTS or headend. In the described embodiment the time slot is assigned by the MAC unit in the CMTS. The cable modem is typically one in a system of modems in which all modems transmit data at the same time using time-division multiplexing and frequency-division multiplexing, processes well known in the field of data communications. These processes are described in *Wireless Communications* by Theodore S. Rappaport (Prentice-Hall 1996 ISBN 0-7803-1167-1), incorporated hereby by reference. It is during this time slot that the cable modem transmits data upstream. At a step 604 the upstream receiver in the CMTS is informed of the time slot assigned to the cable modem at closely the same time the modem is assigned the time slot. A spectrum analyzer as described above is also informed of the time slot at the same time.

At a step 605 the spectrum analyzer performs an FFT on the upstream channel. In the described embodiment an FFT is performed on the entire upstream channel to determine noise levels outside the frequency channel allotted to the cable modem being tested. An FFT is taken of the upstream spectrum at a time when the spectrum analyzer is certain that the cable modem being tested will be transmitting data, thereby producing a first sample frequency-power spectrum. It is expected that this first sample spectrum will have a single at a particular frequency channel allocated to the cable modem and is indicated by a higher dB ratio (described in greater detail below). If the cable modem is faulty, the FFT will also show noise outside the modem's allocated channel. Sample frequency-power spectrums are shown in greater detail in FIG. 7.

At a step 606 the MAC creates a dummy or unused time slot without assigning the time slot to a particular cable modem. By creating a dummy time slot unused by a cable modem, no signal will be transmitted during this dummy time slot. Similar to step 604, at a step 608 the MAC unit informs the upstream received and the spectrum analyzer of the dummy time slot. By doing so these components will know of a definite time slot in which they can expect to receive no signal and only noise.

At a step 610 another FFT is taken during the dummy time slot when the spectrum analyzer is certain that no data is being transmitted on the upstream channel. This second sample frequency-power spectrum is also described in greater detail in FIG. 7. The frequency-power spectrum data from the first (taken at step 605) and second samples is stored in memory accessible by a processor. In the described embodiment, the processor is in the CMTS and is used for other processing functions in the headend. In other embodiments, the processor can reside on a daughter card in the CMTS along with the FFT generator, or be a separate computer.

At a step 612 a processor calculates the "difference" between the two sample frequency-power spectrums. At this stage, the processor takes the difference in power (dB ratio) between each pair of FFT points. In the described embodiment, the frequency-power spectrums created from the FFTs contain 8,192 FFT points or bins. In other embodiments there can be fewer or greater FFT points. Thus, the processor calculates the difference between the first pair of FFT points and stores the difference, and does the same for all the other FFT point pairs. This process is described in greater detail in FIG. 7 which includes, in addition to the two sample frequency-power spectrums described thus far, a third frequency-power spectrum showing the difference between the two samples. At a step 614 the processor saves the differences in power levels between the two samples and increments a counter to indicate that another sampling and associated processing has been completed.

At step 616 the processor determines a sufficient number of samples of both the noise floor (from measuring the dummy time slots) and signals transmitted by the cable modem being tested have been taken. In the described embodiment the processor checks the counter to see how many samples have been taken and compares it to a minimum number that need to be taken in order to get an accurate indication of whether the cable modem being tested is faulty. In the described embodiment, this minimum number is in the range of seven to ten samples. In other embodiments, the number can vary depending on the cable plant and the desired accuracy of the test. If the number of samples has not reached the required minimum, control returns to step 604 where the upstream transmitter and spectrum analyzer are informed of another (possibly the same) time slot assigned to the cable modem since the time slot can be different from the previous time slot.

Figure 7:
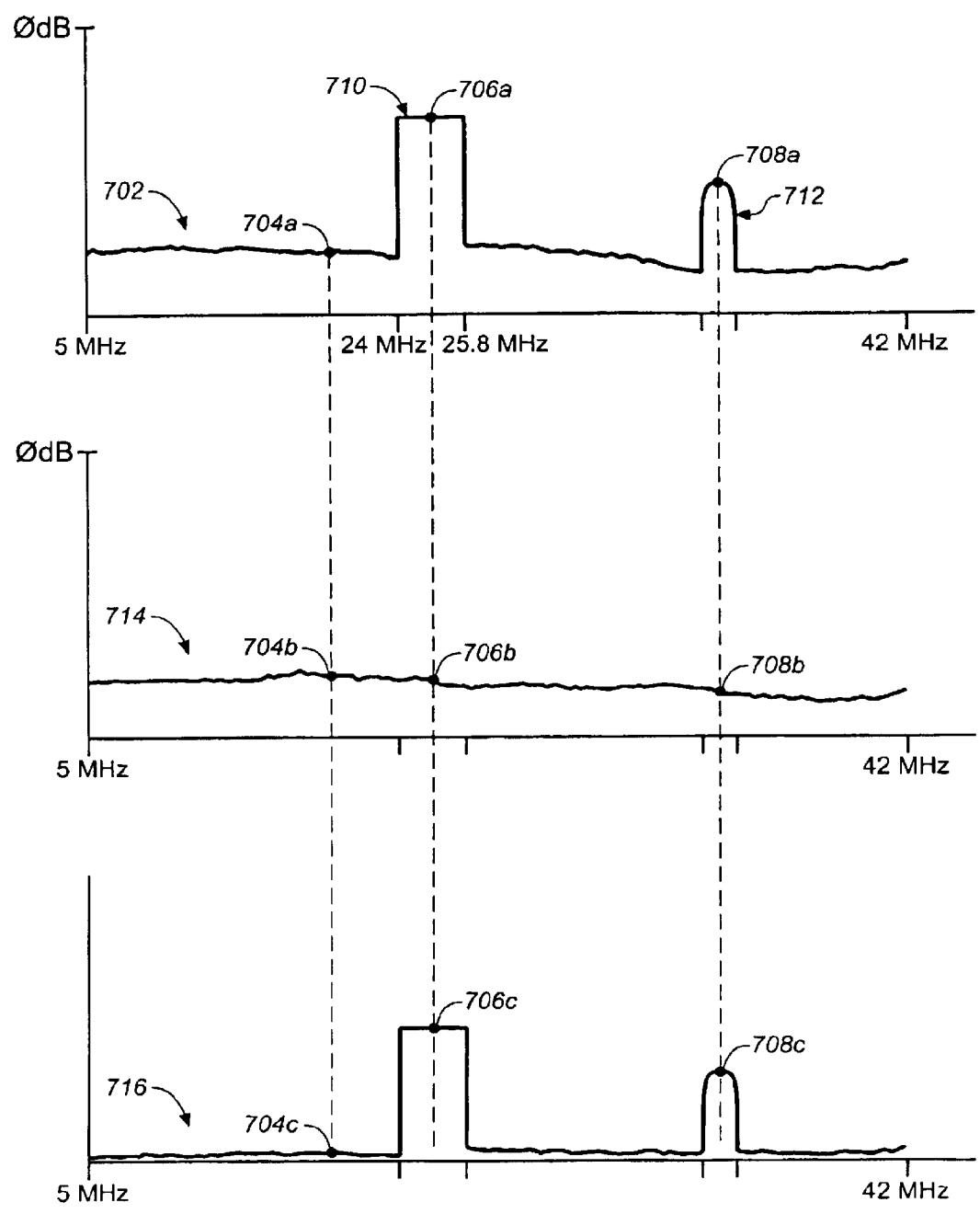
FIG. 7 shows three frequency-power spectrums or graphs including two sample graphs and a graph showing the difference between the two samples in accordance with one embodiment of the present invention.

At a step 618 the processor computes an average or mean of the differences computed and saved at step 614. In the described embodiment, the differences in each pair of FFT points calculated from the samples are averaged. This is done for each pair of FFT points, each pair having a number of samples. In the described embodiment, seven to ten samples are taken. The processor uses the average value of each FFT point or bin to determine whether there is undesirable or unwanted power in channels other than the one allocated to the cable modem being tested. Unwanted power or noise is identified by power levels greater than a particular dB ratio after the difference between the samples have been taken. This difference and threshold power level is shown in FIG. 7. If unwanted power levels are discovered, the cable operator can remedy the situation by taking the cable modem offline since the faulty cable modem is very likely interfering with the upstream signal of other systems of cable modems. This can be done automatically by instructing the MAC unit to disable or no longer assign a time slot to the faulty cable modem, effectively taking the modem off-line. At this stage the subscriber can either replace the cable modem or attempt to fix it, and the process is complete.

As mentioned above, sample FFTs of the upstream frequency are taken by the spectrum analyzer at times when the cable modem being tested is transmitting an upstream signal and at times when no cable modem is transmitting data. The difference between two corresponding samples (one of a cable modem and one of the noise floor) are taken resulting in a frequency-power spectrum that is generally flat except in the channel allocated to the cable modem where a high power (or signal) level is expected. Unacceptable noise is shown as power spikes rising above a threshold power level. FIG. 7 shows three frequency-power spectrums or graphs including two sample graphs and a graph showing the difference between the two samples in accordance with one embodiment of the present invention. Each of the three frequency-power spectrums show power for frequencies in the range of 5 to 42 MHz. In two of the graphs showing sample FFTs, the power is measured in negative ratio dBs with higher ratio dBs at the top of y-axis (i.e., zero dB at the top) and decreasing near the origin.

A frequency-power graph 702 shows a sample FFT measurement of an upstream signal transmitted by a cable modem. Graph 702, as well as the others, described below, is a collection of FFT points taken at one instant in time when the spectrum analyzer knows that a cable modem is transmitting a signal. Sample FFT points 704a, 706a, 708a are identified to assist in elaborating on the process described in FIG. 6. In the described embodiment, there are 8,192 FFT bins in graph 702. For illustrative purposes, the cable modem transmitting the signal has been allocated a 1.8 MHz-wide channel 710 between 24 MHz and 25.8 MHz. Thus, the power level in this portion of the frequency spectrum is high since a signal is being transmitted. Also shown is a noise spur 712 created by the cable modem. The remaining portion of the frequency spectrum shows what is referred to as the "noise floor". It shows the minimum power transmitted on the upstream frequency when no signal or unwanted noise is present. FFT point 704a is in the noise floor, point 706a is in the allocated channel 710, and point 708a is in noise spur 712.

A second sample frequency-power graph 714 is an FFT measurement of the upstream frequency taken at a time when no signal is being transmitted. The entire graph shows the noise floor of the upstream frequency. The same FFT bins are shown as corresponding points 704b, 706b, and 708b, corresponding to the FFT bins shown in graph 702. The only FFT points that are same are 704a (in the noise floor) and 704b. All portions of graph 714 are the same as or very close to those in graph 702 except allocated channel 710 and noise spur 712 of graph 702. The portions are not exactly the same because the noise floor itself can vary slightly at different times due to ingress noise entering the cable plant.

A third graph 716 is not a sample FFT measurement but rather a graph showing the difference between corresponding FFT points in graphs 702 and 712. This is illustrated using the same three FFT points as shown in graphs 702 and 714. An FFT point 704c is computed by subtracting the power level of FET point 704b from 704a. Thus, if 704a is at −49 dB and 704b is at −50 dB, FFT point 704c is at 1 dB. Similarly, an FFT point 706c is the difference between 706a and 706b. For example, since 706a is in the channel allocated to the cable modem, it has a high power level, such as −15 dB. Its corresponding noise floor FFT point 706b has a significantly lower power level, such as −47 dB. The difference between the two 32 dB. All the FFT points in the allocated channel region 710 of graph 702 will have a high power level as shown in graph 716 since the difference between the FFT points in this region between graphs 702 and 714 is high. Finally, an FFT point 708c is the difference between FFT point 708a in noise spur region 712 of graph 702 and noise floor FFT point 708b of graph 714. Here the difference will also be high although not as high as the difference between 706a and 706b. For example, the difference may be in the range of 17 dB.

Once the differences between each pair of the 8,192 FFT points have been calculated, a graph such as a graph 716 is derived. Most of graph 716 is flat since the difference in noise floor power levels is minimal. The portion corresponding to the channel allocated to the cable modem has a noticeable and expected high power level since a signal is being transmitted in that channel. An undersirable high power level caused by noise spur 712 in graph 702 is shown in graph 716 as a spike (reaching point 708c) in which the power level reaches above a threshold power level, such as typically 15 dB for QPSK modulation and 25 dB for QAM16 modulation. Power levels below this threshold, such as the minimal noise floor differences and other less pronounced noise spurs, are not of concern to the cable operator. The cable operator can set this threshold noise level to a value appropriate for the cable plant. When it is determined that the power level is above the threshold and is outside the cable modem's allocated channel, the cable modem can be taken off line and repaired or replaced. This can be done during normal operation of the cable plant, for example by instructing the MAC unit not to assign a time slot to the cable modem thereby disabling its "connection" to the headend.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the spectrum analyzer can be located outside the headend or CMTS and still be capable of taking an FFT of the upstream frequency. In another example, the CPU used for processing the FFT data can be one used by the router housing the CMTS or be a separate processor coupled to the FFT generator on a "daughter" card. In yet another example, other programmable devices beside the FPGA can be used to implement an FFT generator. Accordingly, the present embodiments are to be considered as illustrative and not restrictive, and the invention is not to be limited to the details given herein, but may be modified within the scope and equivalents of the appended claims.

What is claimed is:

1. A method of detecting upstream signal transmission quality of a cable modem on a cable modem network having a plurality of cable modems, the method comprising:

assigning a first time slot to the cable modem in which the cable medium can transmit data upstream;

reserving a second time slot for transmitting data upstream, unassigned to any cable modem on the cable modem network;

informing an FFT generator of the first time slot and of the second time slot;

generating one or more FFT measurements of an upstream spectrum during the first time slot when the cable modem can transmit upstream and the second time slot when no cable modem on the network is transmitting upstream; and comparing FFT measurements of the first time slot with FFT measurements of the second time slot thereby detecting undesirable noise created by the cable modem.

2. A method as recited in claim 1 further comprising informing the upstream receiver of the first time slot and the second time slot.

3. A method as recited in claim 1 wherein a Media Access Control unit assigns the first time slot and reserves the second time slot.

4. A method as recited in claim 1 wherein the FFT measurements are of the entire upstream spectrum.

5. A method as recited in claim 1, wherein generating one or more FFT measurements of an upstream spectrum further includes creating one or more frequency-power spectrum graphs.

6. A method as recited in claim 1 wherein comparing FFT measurements of the first time slot with FFT measurements of the second time slot further includes calculating the difference between two FFT measurements.

7. A method as recited in claim 6 wherein calculating the difference between two FFT measurements further includes taking the difference between the power level of a first FFT point in a first FFT measurement and the power level of a corresponding FFT point in a second FFT measurement.

8. A method as recited in claim 1 wherein comparing FFT measurements of the first time slot with FFT measurements of the second time slot further includes creating a power-difference FFT measurement.

9. A method as recited in claim 1 further comprising incrementing a sampling counter after every second FFT measurement and using the sampling counter to determine whether more FFT measurements are needed.

10. A method as recited in claim 6 further including calculating an average difference of a plurality of differences between two FFT measurements.

11. A method as recited in claim 1 further comprising calculating power differences between the FFT measurement taken during the first time slot and the FFT measurements taken during the second time slot.

12. A method as recited in claim 11 further comprising determining whether any of the power differences are greater than a predetermined threshold power ratio.

13. A method as recited in claim 12 further comprising informing a Media Access Control unit to not assign a time slot to the cable medium if any of the power differences are greater than the predetermined threshold power ratio.

14. A method as recited in claim 11 wherein calculating power differences further includes calculating power differences between pairs of corresponding FFT points taken from FFT measurements of the first time slot and FFT measurements of the second time slot.

15. A cable modem termination system (CMTS) which can issue time slots for upstream transmission by individual cable modems on a cable modem network having a plurality of cable modems, the CMTS capable of detecting faulty cable modems, the CMTS comprising:

an upstream receiver and demodulator capable of receiving an upstream signal;

a Fast Fourier Transform (FFT) engine capable of performing FFT measurements on the upstream signal and storing the FFT measurements; and a processor for performing computation on the FFT measurements and communicating data, wherein the data relates to noise levels of the upstream signal at predetermined times, wherein the predetermined times correspond to a first time when a cable modem is transmitting data upstream, and a second time when no data is being transmitted upstream, wherein the processor is capable of informing the FFT engine of the first time and of the second time, causing the FFT engine to generate one or more FFT measurements of an upstream spectrum during the first time and the second time, and comparing FFT measurements of the first time with FFT measurements of the second time thereby detecting undesirable noise created by the cable modem.

16. A CMTS as recited in claim 15 further comprising:

an anti-alias filter including a low-pass filter; and an analog/digital converter capable of converting an analog signal to a digital signal.

17. A CMTS as recited in claim 15 wherein the FFT engine further includes a field programmable gate array (FPGA) configured to perform an FFT.

18. A CMTS as recited in claim 17 wherein the FPGA further includes a processor interface for communicating data to a processor.

19. A CMTS as recited in claim 15 wherein the FFT engine further comprises memory units for storing twiddle factors and intermediate data for use in an FFT measurement.

20. A CMTS as recited in claim 15 wherein the FFT engine is located outside a headend of a cable television plant.

21. A method of detecting a faulty cable modem in a cable television plant having a plurality of cable modems, the method comprising:

taking a first FFT measurement of an upstream spectrum, creating a first frequency-power spectrum, a time when a cable modem is transmitting data upstream;

taking a second FFT measurement of the upstream spectrum, creating a second frequency-power spectrum, at a time when no data is being transmitted upstream by any of the plurality of cable modems in the cable television plant;

calculating a power-difference between the first FFT measurement and the second FFT measurement;

utilizing the power-difference to determine whether the cable modem is faulty; and informing an FFT generator of the time when no data is being transmitted upstream and of the time when a cable modem is transmitting data upstream.

22. A method as recited in claim 21 further comprising allocating a dummy time slot in which no data is transmitted upstream in the cable television plant.

23. A method as recited in claim 21 wherein calculating a power-difference further comprises calculating the difference between corresponding FFT points in the first frequency-power spectrum and in the second frequency-power spectrum.

24. A method as recited in claim 21 wherein utilizing the power-difference to determine whether the cable modem is faulty further comprises comparing the power-difference with a threshold power level.

25. A method as recited in claim 24, wherein the threshold power level is 15 dB for QPSK modulation and 25 dB for QAM16 modulation.

26. A method of detecting faulty modems in a network employing multiple channels, separated in frequency to allow modems to transmit data, the method comprising:

for a selected modem transmitting data in a frequency channel, comparing extra-channel noise outside the frequency channel when it is transmitting data with a noise floor outside the frequency channel when neither the selected modem nor any other modem on the network is transmitting data; and if the difference between the extra-channel noise when the modem is transmitting and when the modem is not transmitting is greater than a predetermined threshold, disabling the selected modem, wherein comparing the extra-channel noise is performed by comparing frequency-power spectrums at two different predetermined times known to corresponding to times when the selected modem is transmitting and when the selected modem is not transmitting, respectively.

27. A method as recited in claim 26 wherein the network is a cable television plant and the modems are cable modems.

28. A method as recited in claim 26 wherein the predetermined threshold is 15 dB for QPSK modulation and 25 dB for QAM16 modulation.

29. A computer program product for detecting upstream signal transmission quality of a cable modem on a cable modem networking having a plurality of cable modems, the computer program product comprising:

a computer code that assigns a first time slot to the cable modem in which the cable modem can transmit data upstream;

a computer code that creates a second time slot for transmitting data upstream, unassigned to any cable modem on the cable modem network;

a computer code that informs an FFT generator of the first time slot and of the second time slot;

a computer code that generates one or more FFT measurements of an upstream spectrum during the first time slot when the cable modem can transmit upstream and the second time slot when no cable modem on the network is transmitting upstream;

a computer code that compares FFT measurements of the first time slot with FFT measurements of the second time slot thereby detecting undesirable noise created by the cable modem; and a computer-readable medium that stores the computer code.

30. A computer program product for detecting faulty modems in a network employing multiple channels, separated in frequency to allow modems to transmit data, the computer program product comprising:

a computer code that compares, for a selected modem transmitting data in a frequency channel, extra-channel noise outside the frequency channel when the selected modem is transmitting data with a noise floor outside the frequency channel when neither the selected modem nor any other modem on the network is transmitting data;

a computer code that disables the selected modem if the difference between the extra-channel noise when the selected modem is transmitting and when the selected modem is not transmitting is greater than a predetermined threshold; and a computer-readable medium that stores the computer codes, wherein comparing the extra-channel noise is performed by comparing frequency-power spectrums at two different predetermined times known to correspond to times when the selected modem is transmitting and when the selected modem is not transmitting, respectively.

31. A apparatus of detecting upstream signal transmission quality of a cable modem on a cable modem network having a plurality of cable modems, the apparatus comprising:

means for assigning a first time slot to the cable modem in which the cable modem can transmit data upstream;

means for reserving a second time slot for transmitting data upstream, unassigned to any cable modem on the cable modem network;

means for informing an FFT generator of the first time slot and of the second time slot;

means for generating one or more FFT measurements of an upstream spectrum during the first time slot when the cable modem can transmit upstream and the second time slot when no cable modem on the network is transmitting upstream; and means for comparing FFT measurements of the first time slot with FFT measurements of the second time slot thereby detecting undesirable noise created by the cable modem.

32. An apparatus as recited in claim 31 wherein means for comparing FFT measurements of the first time slot with FFT measurements of the second time slot further includes means for calculating the difference between two FFT measurements.

33. An apparatus as recited in claim 31 further comprising means for calculating power differences between the FFT measurement taken during the first time slot and the FFT measurements taken during the second time slot.

34. An apparatus of detecting a faulty cable modem in a cable television plant having a plurality of cable modems, the apparatus comprising:

means for taking a first FFT measurement of an upstream spectrum, creating a first frequency-power spectrum, at a first time when a cable modem is transmitting data upstream;

means for taking a second FFT measurement of the upstream spectrum, creating a second frequency-power spectrum, at a second time when no data is being transmitted upstream by any of the plurality of cable modems in the cable television plant;

means for informing an FFT generating of the first time and of the second time, causing the FFT generator to generate one or more FFT measurements of an upstream spectrum during the first time and the second time, and comparing FFT measurements of the first time with FFT measurements of the second time thereby calculating a power-difference between the first FFT measurement and the second FFT measurement; and means for utilizing the power-difference to determine whether the cable modem is faulty.

35. An apparatus as recited in claim 34 further comprising means for allocating a dummy time slot in which no data is transmitted upstream in the cable television plant.

36. An apparatus as recited in claim 34 further comprising means for informing an FFT generator of the time when no data is being transmitted upstream and of the time when a cable modem is transmitting data upstream.

37. An apparatus as recited in claim 34 wherein means for calculating a power-difference further comprises means for calculating the difference between corresponding FFT points in the first frequency-power spectrum and in the second frequency-power spectrum.

38. An apparatus as recited in claim 34 wherein means for utilizing the power-difference to determine whether the cable modem is faulty further comprises means for comparing the power-difference with a threshold power level.

39. An apparatus as recited in claim 38 wherein the threshold power level is 15 dB for QPSK modulation and 25 dB for QMA16 modulation.

40. A method of detecting a faulty cable modem in a cable television plant having a plurality of cable modems, the method comprising:

taking a first FFT measurement of an upstream spectrum, creating a first frequency-power spectrum, at a time when a cable modem is transmitting data upstream;

taking a second FFT measurement of the upstream spectrum, creating a second frequency-power spectrum, at a time when no data is being transmitted upstream by any of the plurality of cable modems in the cable television plant;

calculating a power-difference between the first FFT measurement and the second FFT measurement; and utilizing the power-difference to determine whether the cable modem is faulty, wherein utilizing the power-difference to determine whether the cable modem is faulty further includes comparing the power-difference with a threshold power level, and wherein the threshold power level is 15 dB for QPSK modulation and 25 dB for QAM16 modulation.

41. A method of detecting faulty modems in a network employing multiple channels, separated in frequency to allow modems to transmit data, the method comprising:

for a selected modem transmitting data in a frequency channel, comparing extra-channel noise outside the frequency channel when it is transmitting data with a noise floor outside the frequency channel when neither the selected modem nor any other modem on the network is transmitting data; and if the difference between the extra-channel noise when the modem is transmitting and when the modem is not transmitting is greater than a predetermined threshold, disabling the selected modem, wherein the predetermined threshold is 15 dB for QPSK modulation and 25 dB for QAM16 modulation.

* * * * *